United States Patent [19]

Segui

[11] 3,893,062

[45] July 1, 1975

[54] TRANSMISSION SYSTEM

[75] Inventor: Alain Georges Segui, Rennes, France

[73] Assignee: Establissement Public dit: Agence Nationale de Valorisation de la Recherche, France

[22] Filed: June 20, 1973

[21] Appl. No.: 371,599

[30] Foreign Application Priority Data

June 23, 1972 France .............................. 72.22799

[52] U.S. Cl. ...................... 340/5 R; 325/28; 325/34; 340/5 T

[51] Int. Cl. ............................................ H04b 11/00

[58] Field of Search ................. 340/3 FM, 5 R, 5 T; 325/34, 28; 343/17.5

[56] References Cited

UNITED STATES PATENTS 2,399,469 4/1946 Cook .................................... 325/34

3,466,652 9/1969 Heyser ............................ 340/3 FM

FOREIGN PATENTS OR APPLICATIONS 842,961 5/1970 Canada ................................ 325/34

*Primary Examiner*—Richard A. Farley

*Attorney, Agent, or Firm*—Laff, Whitesel & Rockman

[57] ABSTRACT

A transmission system uses a carrier frequency subject to periodic variations according to a predetermined variation law. A local receiver frequency is also subject to periodic variations according to the same predetermined variation law. A beat frequency resulting from mixing the modulated carrier frequency and the local frequency is selected by a band filter having a center selected according to the length of a path from the transmitter to the receiver, and according to the phase difference between the carrier frequency variation and the local frequency variation.

6 Claims, 8 Drawing Figures

TRANSMISSION SYSTEM

The present invention relates to a transmission system designed for avoiding, at the receiving station, interferences resulting from multipath transmission. More particularly, it relates to an ultrasonic transmission system for underwater transmission.

In an underwater transmission between a point located at the surface of the sea and an immerged point or between two immerged points, several transmission paths are possible due to reflections from the bottom or the surface of the sea. It may be considered that, between the transmission and the reception point, there is a water sheet limited by surfaces reflecting ultrasonic waves. Then, measures must be considered, at the receiving station, for avoiding interferences. Thus, both at receiving and transmitting stations, highly directional transducers are used, which are respectively pointed in directions corresponding to the shortest or direct path. Signals transmitted through secondary paths have substantially lower energy levels than those of the direct or shortest path. That method can be used with simple means only if transmission and reception points are known.

Other methods than those using directional transducers have already been used for suppressing multipath effects. Thus, it has been suggested to use several transmitters operating at several close transmission frequencies, received signals being mixed in the receiver. Also, U.S. Pat. No. 2,278,779 has used, at the transmission station, a carrier frequency on which, in addition to the modulation of the signal to be transmitted, a constant modulation is superimposed so as to simulate the effect of transmissions of several close carrier frequencies. The receiver is a conventional receiver. However, that method does not separate and select signals from different paths.

Recently, for solving that problem, it has been proposed, at the transmission station, to encode each elementary information item. At the reception station, each received coded elementary information item is compared with each of the elementary information items having a known code so as to select only that which has the best coherence. That method needs, in the receiving station, the installation of complex and costly data logic processing devices. In addition, it does not enable separation of signals from different paths.

A purpose of this invention is to provide a transmission system which avoids interferences caused by multipaths transmission, and which is simple and more efficient than prior art systems.

Another purpose of this invention is to provide a transmission system which makes it possible to separate signals from different paths, and in particular, to keep only, for example, that from the direct or shortest path.

According to the present invention, there is provided a transmission system wherein the carrier frequency is subject to periodic variations according to a predetermined variation law, and wherein the local receiver frequency is also subject to periodic variations according to the same predetermined variation law. The beat frequency resulting from mixing the modulated carrier frequency and the local frequency is selected by a band filter having a center frequency selected according to the length of a path from the transmitter to the receiver, and according to the phase difference between the carrier frequency variation and the local frequency variation To have this invention better understood, reference will be made to a known system for measuring altitude in aircrafts, wherein the frequency of an UHF transmitter may be varied between two predetermined limits. Transmitted waves, reflected from ground, are received in the receiver after a certain delay with respect to waves transmitted at the same time. The delay is proportional to the aircraft altitude. The resulting beat frequency is measured by a frequency meter and read out is indicated on the measure instrument directly, as in meters, for example. The transmitter and the receiver, both being located in the aircraft, may be separated or combined in a single apparatus.

According to another feature of the prsent invention, the carrier frequency variation is a linear variation from a bottom limit to a top limit.

According to another feature of the present invention, each elementary period of the variation of the carrier frequency transmitted from the transmitter is preceded by the transmission of a synchronization signal which, after having being received in the receiver, initiates, after detection, the local frequency variation.

According to another feature of the present invention, the receiver includes several local oscillators corresponding to as many transmission paths, whose frequency variations are initiated by the sequence of synchronization signals received from different paths. Each oscillator is associated with an analog multiplier followed by a filter centered on the beat frequency. Output signals from filters are detected and combined after having passed through delay lines, having delays depending on differences in path lengths.

According to another feature of the present invention, the carrier frequency is subject to several simultaneous variations having identical variation laws, the receiver comprising as many filters as there are simultaneous variations. The variations are synchronous, which make it possible to transmit parallel digital data with as many condition pairs as variations.

Other features of the present invention will appear more clearly from the following description of an embodiment, the said description being made in conjunction with the accompanying drawings, wherein.

Figure 1:
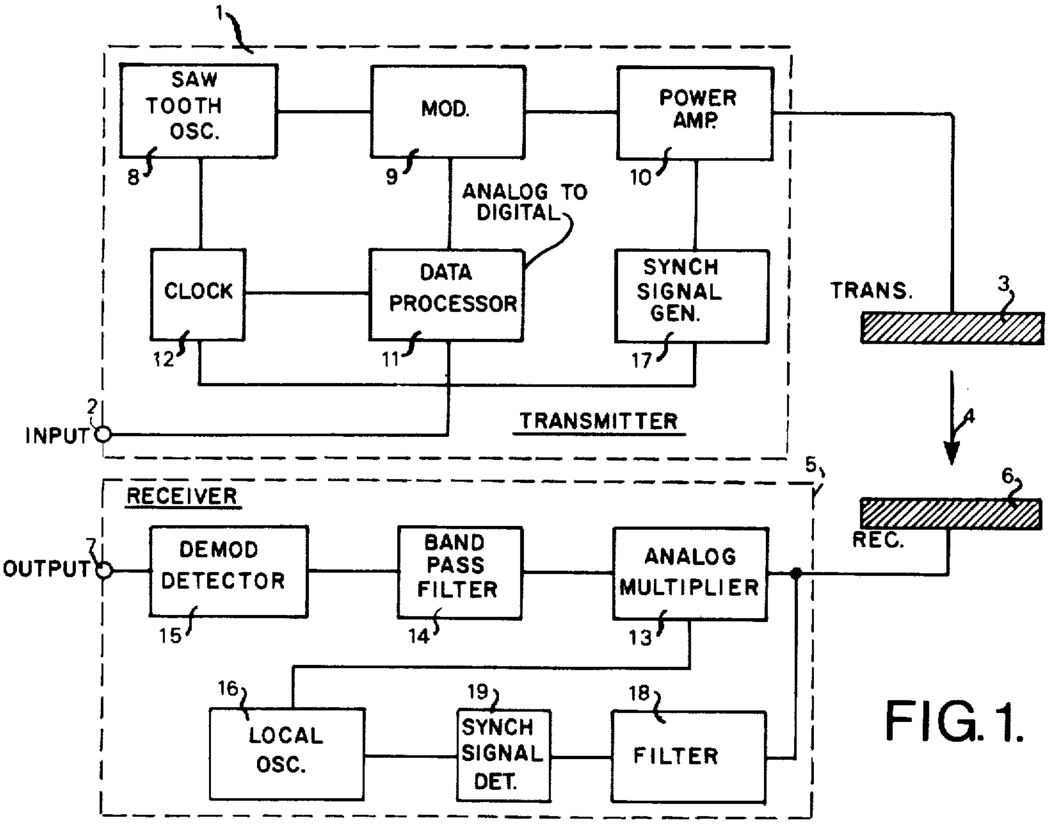
FIG. 1 is a schematic block diagram of a transmitter and a receiver operating according to the system of this invention.

FIG. 1 is a block diagram of a transmitter 1 for receiving data signal, to be transmitted, from terminal 2 and for applying ultrasonic frequency signals to a transmitting transducer 3, designed for radiating ultrasonic waves through an underwater medium represented by the arrow 4. A block diagram of a receiver 5 is coupled with an ultrasonic receiving transducer 6, which is designed for receiving ultrasonic waves radiated from the transmitting transducer 3. The detected signals are processed in receiver 5 and applied to an output data signal terminal 7.

According to the system of this invention, the transmitter 1 comprises an oscillator 8, whose frequency varies according to a linear law, followed by a modulator 9 and a power amplifier 10 having its output connected to a transmitting transducer 3. Data signals applied to input terminal 2 are processed in a circuit 11, which is, for example an analog-digital converter for converting the analog information applied to 2 into an uncoded pulse train, which is applied to modulator 9. A clock 12 is also provided for synchronizing oscillator 8 and for operating converter 11.

Receiver 5 comprises an analog multiplier 13 having one input connected from transducer 6, and an output connected to a band-pass filter 14 followed by a demodulator-detector 15. The other input of multiplier 13 is connected from the output of the local oscillator 16, whose frequency is variable according to the same linear law as that which is applicable to oscillator 8.

In transmitter 1, a synchronization signal generator 17 applies to amplifier 10 synchronization signals which, in receiver 5 are filtered in a filter 18 followed by a logic circuit 19 which applies synchronization signals to local oscillator 16 so as to synchronize the frequency variation of oscillator 16 with the corresponding variations of oscillator 8. Generator 17 is also connected from clock 12.

Before describing in detail the operation of the circuits of transmitter 1 and receiver 5 (FIG. 5), I will describe an underwater transmission between transmitter 1, which is assumed to be located at the surface of the sea, and the receiver 5, which is assumed to be located on the surface of the sea, and the receiver 5, which is assumed to be located on the bottom at certain horizontal distance $r$ and depth $h$, $r$ being substantially longer than $h$. In those conditions, several transmission paths are possible between transmitter 1 and receiver 5.

Figure 3:
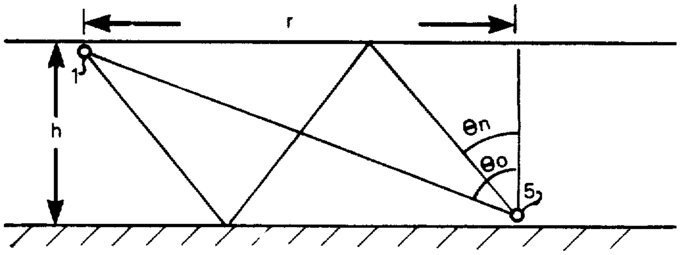
FIG. 3 is a graphical illustration showing several underwater transmission paths between a transmitter located close to the surface and a receiver located on the bottom of the sea.

At the receiving station 5, the angle $\theta o$ (FIG. 3) of the direct path is given by the relation:

$$\theta o = \mathrm{Arc}\ tg\ \frac{r}{h}$$

Likely, for the incidence angle $\theta$ of the $n$th parasitic path (in FIG. 3, $n = 2$), it results:

$$\theta = \mathrm{Arc}\ tg\ \frac{r}{(2n+1)h}$$

The length of the optical direct path is given by the relation:

$$zo = \frac{h}{\cos \theta o}$$

Likely for the $n$th parasitic path, it results:

$$zn = \frac{(2n+1)h}{\cos \theta n}$$

The energy loss (without taking into account any absorption) is given by the well known relation $$H = 20\ \mathrm{Log}\ zn + nR$$

$H$ being expressed in $d$B, $zn$ in meters, and $R$ being a coefficient depending on the incidence angle and of the nature of materials forming the bottom of the sea.

For example, with $r = 2{,}000\ m$ and $h = 80\ m$, the following table of values may be established:

| Paths | νn | R | Length in m | Losses in dB | Path duration in ms | Delay in ms |
|---|---|---|---|---|---|---|
| 1st | 87° 71 | 0 | 2002.1 | 66 | 1 334.75 | 0 |
| 2nd | 83° 15 | 0 | 2014.34 | 66 | 1 342.89 | 8.1 |
| 3rd | 78° 69 | 0.46 | 2039.6 | 67.2 | 1 359.73 | 25 |
| 4th | 74° 35 | 1.3 | 2076.9 | 69.9 | 1 384.61 | 49.8 |
| 5th | 70° 20 | 1.5 | 2125.56 | 72 | 1 417.10 | 82.352 |

The above table shows that, those paths can be neglected which have levels which are lower by at least 3 $d$B; however three remaining paths must be taken into account. Also note that the third path is delayed by 25 ms with respect to the first one.

It might be easily ascertained that a simple amplitude modulation would result in a reception disturbed by a combination of received signals from different paths, unless the transmitted modulation is complicated by decoding pulses according to an error correction code, provided with sufficient redundacy. Likely, it would be easy to see that the coherence of a conventional frequency modulation would be destroyed by received signal combination.

Figure 4:
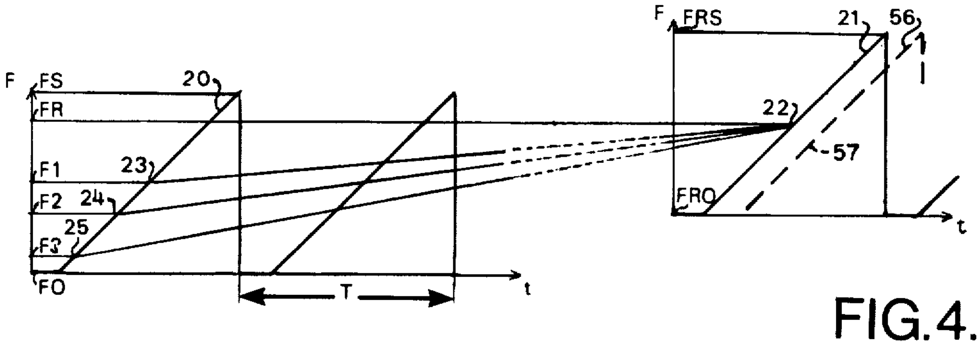
FIG. 4 is a graphical illustration of carrier frequency variations at the transmitting station and local frequency variations at the receiving station, versus time.

FIG. 4 makes it possible to better understand the operation of the system according to this invention.

The curve 20, FIG. 4, shows carrier frequency variation versus time at the output of circuit 8 of transmitter 1. That variation is a saw-tooth variation of period T. That is, each cycle of carrier frequency increases from FO to F$s$ in a linear manner, then it very quickly resets to frequency FO. Finally during a short time interval, the frequency remains constant and equal to FO. Then the frequency variation cycle is resumed.

The curve 21, FIG. 4, shows the variation of frequency Fr of output signal from local oscillator 16 of receiver 5, versus time $t$. Variations of frequency Fr also are saw-tooth variations, with a frequency increasing linearly from FRO to FRs, then with a quick return to frequency FRO and finally with a constant frequency equal to FRO during a short time interval. The period of variations of frequency FRO is equal to the period T of variations of frequency F. Moreover, the frequency difference between FRS and FRO is equal to that existing between FS and FO.

On curve 21, a point 22 has been indicated which represents a reception time in receiver 5. At that reception time, transducer 6 at receiver 5 receives signals from the transmitting transducer 3, with reception being through several transmission paths. As these transmission paths have different lengths, the different signals received at time 22 will have been transmitted from transducer 3 at different previous times, for example, at time 23 for the signal received by transducer 6 from the direct path, at time 24 for the signal received by transducer 6 after two reflections and at time 25 for a signal received by transducer 6 after more than two reflections. At time 23, the carrier signal from oscillator 8 had frequency F1, at time 24, it had frequency F2 and, at time 25, it had frequency F3. When signals received by transducer 6 are processed in the analog multiplier or mixer 13, they cause frequency beats with the frequency from local oscillator 16 which, at time 22, is FR. Thus, from the output of mixer 13, there will be a signal of beat frequency F1 – FR, a second signal of beat frequency F2 – FR, and a third signal of beat frequency F3 – FR. Filter 14 is, for example, centered on beat frequency F1 – FR. Thus, from the output of filter 14, there will be only the signal component coorresponding to the direct path. Accordingly, in the system of this invention, the separation of signals transmitted through different transmission paths has been achieved.

The short time interval, during which the frequency remains equal to FO, is used to transmit a synchronization signal through generator 17 and amplifier 10, such a synchronization signal being received in 5 and making it possible to trigger the linear variation of local oscillator 16.

Figure 2:
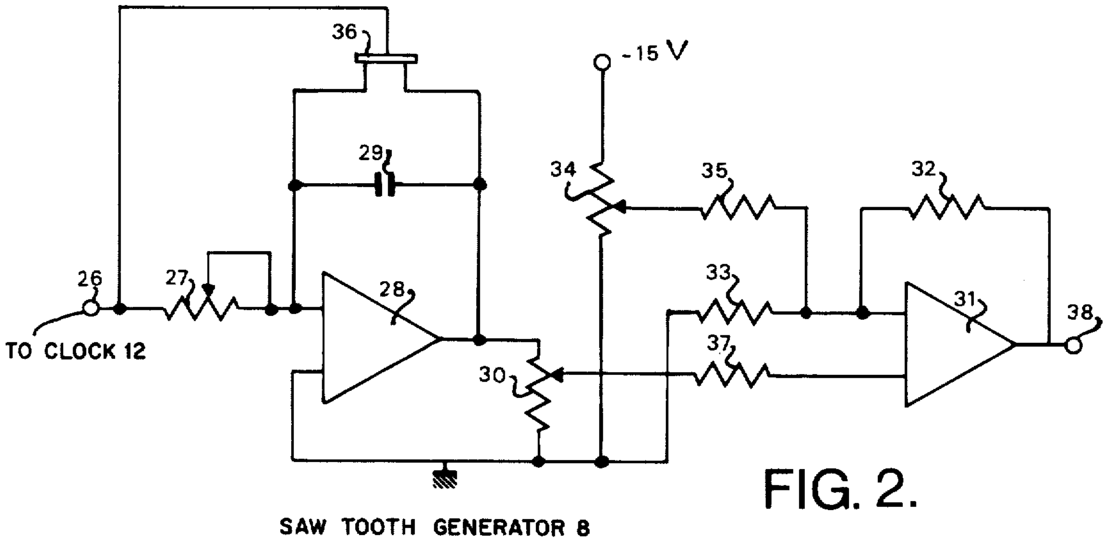
FIG. 2 is a diagram of a saw-tooth generator used in the transmitter shown in FIG. 1.

Oscillator 8 of transmitter 1 may be made of a voltage saw-tooth generator followed by a voltage-frequency converter. FIG. 2 shows a voltage saw-tooth generator which may be used as a first circuit of oscillator 8. Signals from clock 12 are applied to terminal 26 which is connected by a variable resistor 27 and then to the negative input of an operational amplifier 28, that is connected as an analog integrator having a long time constant. Feedback from the output to the input of amplifier 28 is achieved through a capacitor 29. The positive input of amplifier 28 is grounded. The output of amplifier 28 is applied, through a potentiometric resistor 30 to a positive input of an operational amplifier 31, that is used as an analog adder for adding a DC voltage to output signal from amplifier 28, so as to adjust the frequency variation in a desired frequency band. The output of amplifier 31 is connected to its negative input by a feedback resistor 32. Moreover, the negative input of amplifier 31 is connected to ground through resistor 33, and to voltage divider 34, through resistor 35.

The saw-tooth variation from the output of amplifier 28 is produced by connecting, in parallel with capacitor 29, a FET transistor 36. Terminal 26 is normally at the potential - 15 V and the integrator amplifier 28 delivers an output signal having an amplitude, linearly increasing. When a pulse from clock 12 is applied to terminal 26, that slightly positive pulse triggers transistor 36 which very quickly discharges capacitor 29, thereby resetting the output of integrator 28 to its initial position. Adding resistor 37 is connected to the cursor of variable resistor 30 at a positive input of amplifier 31. A saw-tooth generator output signal is applied from terminal 38 to input terminal 39 (FIG. 5) of voltage-frequency converter.

Figure 5:
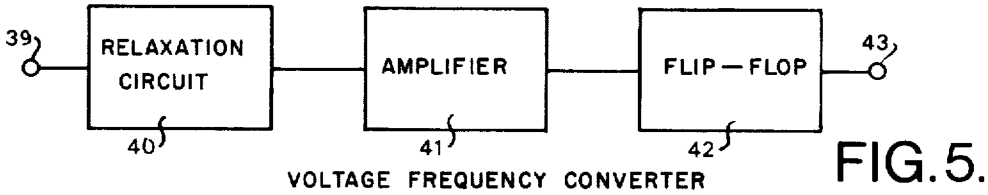
FIG. 5 is a schematic block diagram of a voltage-frequency converter used in the transmitter shown in FIG. 1.

In a preferred embodiment of this invention, the linear voltage variation is converted into a linear frequency variation in a converter, such as that shown in FIG. 5, which comprises a relaxation circuit 40 followed by an amplifier 41 and a flip-flop 42, whose output 43 delivers square signals having a linearly variable frequency.

Relaxation circuit 40 may include a capacitor connected in a circuit, where it operates as current generator when it is discharged which, when its voltage reaches a predetermined valve, triggers the transmission of a pulse, after what it is immediately charged again. The capacitor charged voltage is applied to terminal 39 and, as that voltage provided from terminal 38 linearly increases, the time during which capacitor circuit 40 is being discharged, decreases as applied voltage increases. Therefore, the frequency of pulses transmitted from circuit 40 increases in a linear manner. Circuit 41 is an amplifier having a high input impedance, which delivers pulses having variable spacings to flip-flop 42 which is a suitable connected JK flip-flop. Flip-flop 42 is alternately turned from condition 1 to condition 0 or from condition 0 to condition 1, each time a pulse is applied to its input. Thus, the output of flip-flop 42 delivers a frequency modulated square signal.

In receiver 5, local oscillator 16 may have a structure similar to that of oscillator 8, taking into account that the local oscillator frequency band is selected so as to obtain a suitable beat frequency from output of mixer 13. The initial frequency of oscillator 16 may be, for example, adjusted by setting the position of the cursors of variable resistors 30 and 34, FIG. 2. From the description of the saw-tooth generator shown in FIG. 2, it appears that each clock pulse causes the output frequency of oscillator 8 to decrease quickly from maximum frequency FS (FIG. 4) to the initial frequency FO. The clock pulse is also applied to synchronization signal generator 17 which, at that time, applies a synchronization signal to amplifier 10. That signal is, for example, a pure frequency at value FO which, after having been received in receiver 5, is filtered by the filter 18 followed by a logic detector circuit 18 which applies to oscillator 16 a pulse in the same manner as clock 12 applies a pulse to oscillator 8 to trigger the linear variation.

In the embodiment shown in FIG. 1, it has been assumed that information to be transmitted was applied to terminal 2 connected to an analog - digital converter 11 whose output is applied to modulator 9 and operation is controlled by clock 12. In the case of pulse modulation, modulator 9 may be a simple analog gate using the source-drain transmittance of a FET transistor to modulate the carrier transmitted from circuit 8.

Figure 6:
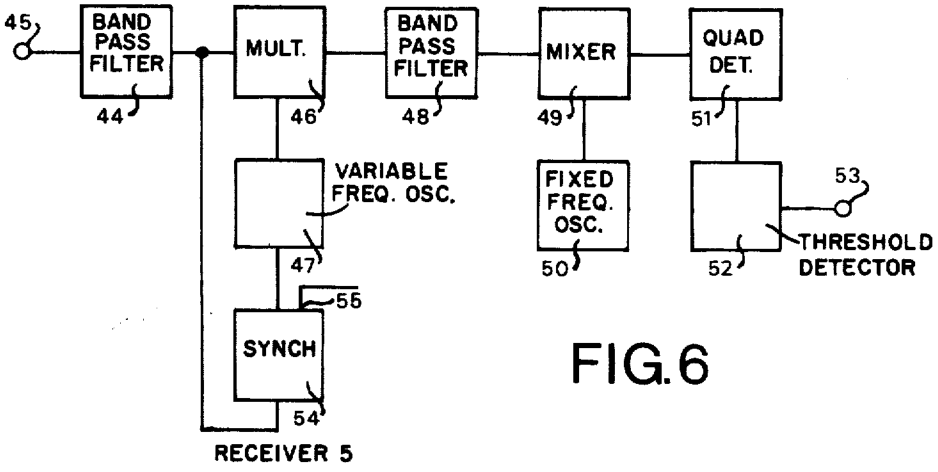
FIG. 6 is a more detailed block diagram of the receiver shown in FIG. 1.

Receiver 5, shown in FIG. 1, is shown with more details in FIG. 6. It comprises a first band filter 44 for receiving signals from transducer 6 via terminal 45. Filter 44 limits the noise band to the utilized frequencies. It is followed by an analog multiplier 46 whose second input is connected from the output of variable frequency local oscillator 47. The output from the multiplier 46 is applied to a filter 48 having a frequency band width adjusted for passing only a beat signal corresponding to only one transmission path. The output from filter 48 is applied to a frequency mixer 49 whose second input is connected from a fixed frequency local oscillator 50. Thus, it is still easier to eliminate any beat frequency resulting from a parasitic path. The output of the frequency mixer 49 is connected to a detector 51 which, in a preferred embodiment of this invention, is a quadratic detector 51, which is itself followed by a threshold decision circuit 52. Received information signals are sent to the utilization circuit via terminal 53.

Variable frequency local oscillator 47 is synchronized by circuit 54 which separates synchronization signals received through 44. When circuit 54 is provided with a time separator for separting synchronization signals received from 44 through transmission paths having different lengths, it may dispatch to several outputs, among them output 55 is shown, separated synchronization signals. Then output 55 is connected to a second variable frequency local oscillator (FIG. 7), identical to oscillator 47, which delivers a variable frequency signal to a second multiplier, such as 46, followed by a chain of circuits identical to 48, 49, 51 and 52. With respect to s curve 21, FIG. 4, output frequency variation of the second variable frequency local oscillator (FIG. 7) would have a frequency versus time position as shown by the curve 56. The signal received at the time corresponding to point 57, having the same ordinate as the point 22 on 21 and whose beat frequency is F1 – FR, corresponds to the signal transmitted from transmitter 1 at time 23 and propagated through the second transmission path. Thus, it appears that, with a second filter (FIG. 7) identical to filter 48 and connected to the second multiplier output, the second path signals may be isolated. This will become clearer from the descriptions of FIGS. 7 and 8 which follow.

Synchronization signal generated by generator 17 may be a pure frequency signal, pulse compression reception signal, pseudo-random code signal or, more generally, any conventional synchronization signal.

As already mentioned, several oscillators 8 may be provided in transmitter 1. Those oscillators have frequencies subject to parallel variations, the difference between each minimum frequency in a variation being sufficient to cause no interference. Obviously receiver 5 (FIG. 8) includes as many reception channels as there are oscillators 8 in transmitter 1.

Figure 7:
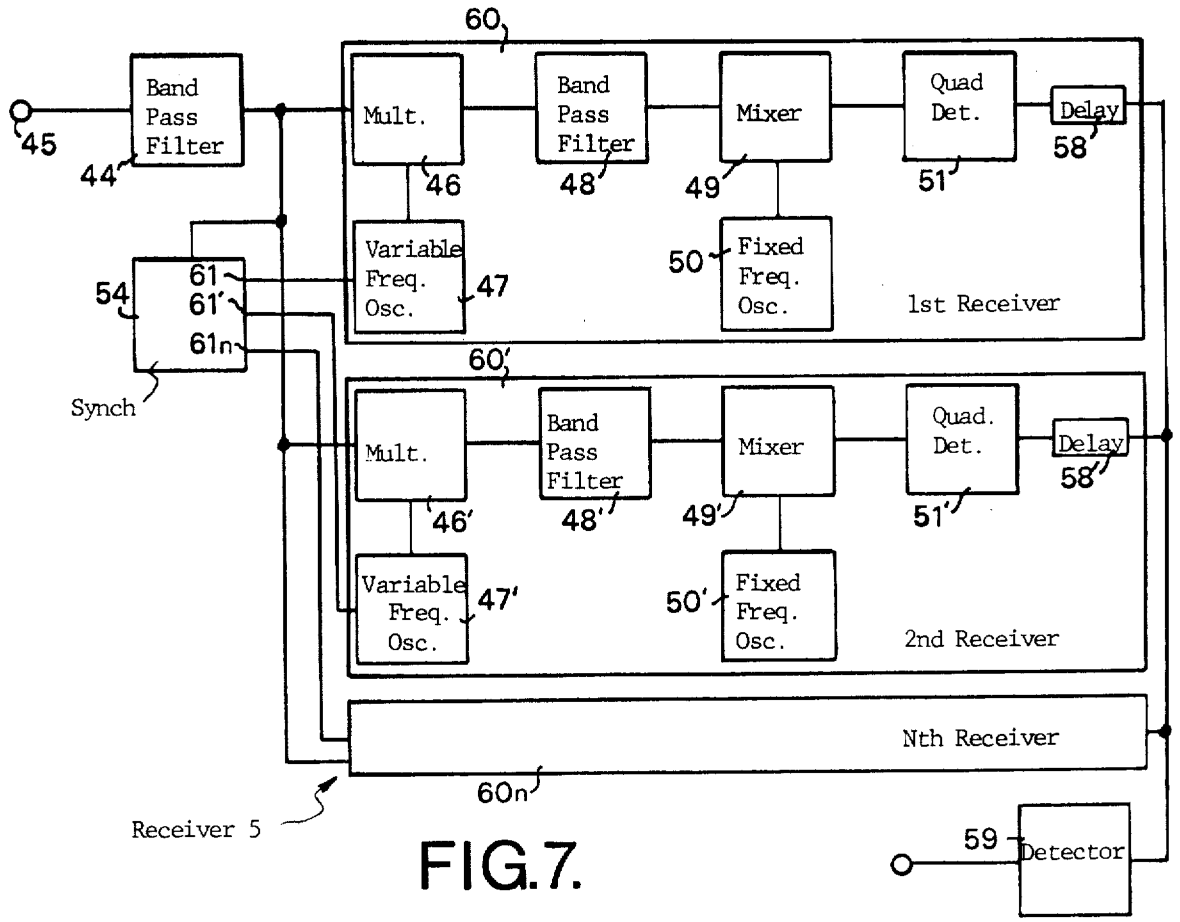
FIG. 7 is a block diagram showing how a plurality of the receivers of FIG. 6 may be assembled into a complete receiver system.

In FIG. 7, the same numerical reference will be used to indicate the duplications of circuits which are also shown in FIGS. 6. In greater detail, the receiver 5 may have many channels as shown in FIG. 7. Receivers comprise a band pass filter 44 for receiving at input terminal 45 signals picked up by receiving transducer 6 (FIG. 1). The output of band pass filter 44 is coupled to deliver signals to each of a plurality of receiver channels 60, 60', . . . , **60*n*. Each receiver channel 60, 60' . . . 60*n* is essentially the same as the single receiver channel 5 shown in FIGS. 1 and 6. For example, receiver channel 60 comprises a variable frequency local oscillator 47, multiplier 46, filter 48, mixer 49, fixed frequency oscillator 50 and quadratic detector 51, each of which is respectively identical to the corresponding circuits shown in FIG. 6. Receiver channel 60' comprises variable frequency local oscillator 47', multiplier 46', filter 48', frequency mixer 49', fixed frequency oscillator 50 and quadratic detector 51' which again respectively operate as the corresponding circuits in FIG. 6. Receiver 60*n*** comprises corresponding circuits (not shown) and indicates that any suitable number of receiver channels may be provided.

Each variable frequency oscillator 47, 47', etc., is synchronized by circuit 54, which responds to and separates synchronization signals received through filter 44. Circuit 54 has as many outputs as there are receivers **60–60*n* (as also indicated by an output 55 in FIG. 6). Since the picked up signals travel over different transmission paths having different lengths, the synchronizing signals are naturally displaced in time. Therefore, in general, circuit 54 may be a time separator for separating synchronication signals received from filter 44. Circuit 54 dispatches separated synchronization signals to outputs 61, 61', . . . , 61*n*, which are respectively connected to variable frequency local oscillators 47, 47', . . . , 47*n*. Quadratic detectors 51, 51', etc., are respectively connected to delay circuits 58, 58', etc., which provide compensating transmission delays in accordance with transmission path length differences. The outputs of the delay circuits 58 are combined in a threshold decision circuit 59**.

Figure 8:
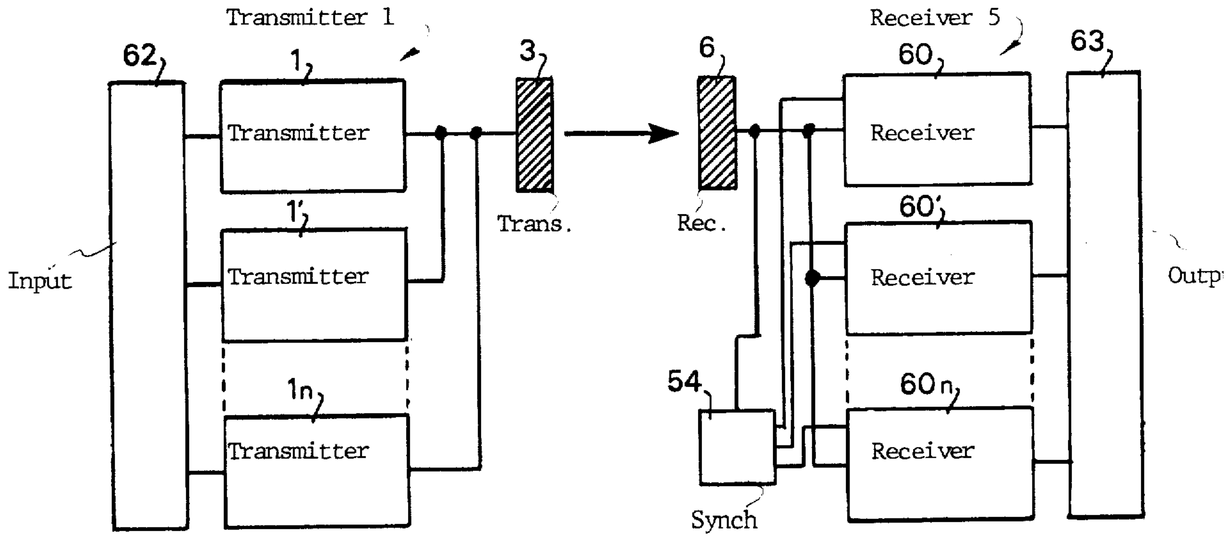
FIG. 8 is a block diagram showing how a number of transmitters of FIG. 1 may be integrated into the system of FIG. 7.

FIG. 8 shows a complete transmission system incorporating the channels of FIG. 7 for transmitting and receiving parallel data on each of several underwater transmission channels. More particularly, several transmitter channels 1, 1', . . . , **1*n* deliver output signals to the transmitting transducer 3. Each transmitter channel is separately modulated by any suitable data delivered from any suitable input device 62, which may be a source of several data streams. The receiving transducer 6 picks up the data received over underwater path 4 and forwards it to receiver channels 60–60*n*. Therein, the appropriate data is correctly demodulated responsive to synchronization signals provided from circuit 54, as taught in FIG. 6. Demodulated data is then distributed by any suitable output circuit. For example, this data may be grouped in circuit 63 to correspond or be identical to the original data from input 62**. Such an arrangement enables transmission of parallel data on each transmission channel and particularly digital data, each pair of digital data conditions corresponding to a channel.

In the above described embodiment, reference has been made to a pulse modulated carrier; however, the system of this invention is not limited to this type of modulation, analog amplitude modulation may also be used. Likely, the system is not limited to amplitude modulation, but is suitable for any angular modulation and, in particular for two-condition phase modulation. Obviously, whatever is the modulation use, the modulated carrier frequency band width must be less than a certain limit depending on differences between close path lengths.

Also to be noted that the transmission system according to this invention is not limited to ultrasonic frequencies, but may be used in any frequency band.

While the principles of the present invention have been hereabove described in relation with a specific embodiment, it must be understood that the said description has only been made by way of example and does not limit the scope of this invention.

What is claimed is:

1. An ultrasonic underwater transmission system comprising a transmitter and at least one remote receiver, means in said transmitter for transmitting a carrier frequency modulated with an intelligence signal, means in said receiver for generating a first local receiver frequency, both said carrier frequency and said local frequency being subject to periodic variations according to a same predetermined variation law whereby said carrier and local frequencies naturally beat with each other as a function of said variations, means responsive to said beat frequency resulting from a beating of the received carrier frequency and the said first local frequency for filtering a band of signals having a center frequency selected according to the length of an underwater transmission path from said transmitter to said receiver and to the phase difference between said carrier frequency variation and the local frequency variation, and means for demodulation of said intelligence signal.

2. The underwater transmission system according to claim 1, wherein said periodic phase variations have upper and lower limits, said predetermined variation law comprising a linear variation from said lower to said upper limit.

3. The underwater transmission system according to claim 1 and mixer circuit means, means for applying said beat frequency to said mixer circuit means, means for generating a local signal at a second and fixed local frequency and applying it to said mixer means, quadratic detector means, and means for applying an outut signal from the mixer means to said quadratic detector for doubling the differences of frequencies of signals received over different underwater paths.

4. The underwater transmission system according to claim 3, wherein there is at least one ultrasonic transmitting transducer for transmitting a plurality of elementary carrier frequencies and a plurality of receiver channels, said receiver channels being located at a common location, each elementary transmitter carrier frequency having a variation period depending upon the length of the transmission path between said transmitter and said receiver, means associated with each transmitted carrier frequency for transmitting a synchronization signal phased with the carrier frequency variation, each receiver channel including means responsive to detection of a corresponding one of said synchronizing signals for triggering the associated first local frequency generator variation thereby varying the local frequency according to the length of said transmission path, wherein the intermediate frequencies of said receivers are triggered responsive to reception at said receivers of signals transmitted over many different underwater paths, delay means, and means including said delay means for combining said quadratic detector output signal after having passed through said delay means.

5. The underwater transmission system according to claim 1 wherein the carrier frequency has several sub-carriers which are subject to several synchronous periodic variations having an identical variation law, the receiver having several filtering means each with an associated demodulating means, each filtering means being centered on the frequency of an associated sub-carrier, in order to transmit parallel digital data with as many pairs of data conditions as sub-carriers.

6. The ultrasonic underwater transmission system according to claim 3 comprising an ultrasonic transmitter and a plurality of ultrasonic receivers, all of said receivers being located at substantially the same point, there being intermediate beat frequencies respectively corresponding to underwater paths having different lengths, the said ultrasonic transmitter including means for transmitting synchronization signals phased with carrier frequency variation, each said ultrasonic receiver including means responsive to the receipt of said synchronization signals for triggering the associated first local frequency generator to produce a local frequency variation according to the underwater path followed by the synchronizing signal, and delay means connected from each quadratic detector in each of said receivers for delaying the output signal from said detector by a time period corresponding to the associated underwater path, the outputs of said delay means being combined to provide a combined outut signal.

* * * * *

UNITED STATES PATENT OFFICE
CERTIFICATE OF CORRECTION

PATENT NO. : 3,893,062

DATED : July 1, 1975

INVENTOR(S) : Alain Georges Segui

It is certified that error appears in the above-identified patent and that said Letters Patent are hereby corrected as shown below:

Col. 2, line 12, after "directly" insert --calibrated--; col. 3, line 22, after "to" insert --input terminal--; col. 3, line 27, after "connected" insert --to receive signals--; col. 3, line 46, delete all of line; col. 3, line 47, delete "assumed to be located"; col. 4, line 24, change "v" to --$\theta$--; col. 5, line 1, after "time", insert --the receiving--; col. 5, line 22, change "coorres-" to --corres---; col. 6, line 43, change "18" (second occurrence) to --19--; col. 7, line 10, change "separting" to --separating--; col. 7, line 19, change "s" to --a--;

Signed and Sealed this

*ninth* Day of *December 1975*

[SEAL]

*Attest:*

RUTH C. MASON
*Attesting Officer*

C. MARSHALL DANN
*Commissioner of Patents and Trademarks*